United States Patent
Persaud et al.

(10) Patent No.: US 11,831,774 B2
(45) Date of Patent: Nov. 28, 2023

(54) SYSTEM AND METHOD OF AUTHENTICATING DEVICES FOR SECURE DATA EXCHANGE

(71) Applicant: Humana Inc., Louisville, KY (US)

(72) Inventors: Anthony Persaud, San Diego, CA (US); Andrew Flores, San Diego, CA (US); Henry Spindell, San Diego, CA (US); Avery Ryder, San Diego, CA (US); Jaewook Chun, San Diego, CA (US); Salvatore Nuziale, Playa Vista, CA (US)

(73) Assignee: Humana Inc., Louisville, KY (US)

( * ) Notice: Subject to any disclaimer, the term of this patent is extended or adjusted under 35 U.S.C. 154(b) by 147 days.

(21) Appl. No.: 17/342,683

(22) Filed: Jun. 9, 2021

(65) Prior Publication Data
US 2022/0400009 A1    Dec. 15, 2022

(51) Int. Cl.
*H04L 9/32* (2006.01)
*H04L 12/18* (2006.01)
*H04L 67/104* (2022.01)
*H04L 9/08* (2006.01)
*H04L 67/55* (2022.01)

(52) U.S. Cl.
CPC .......... *H04L 9/3213* (2013.01); *H04L 9/0825* (2013.01); *H04L 9/3228* (2013.01); *H04L 12/1822* (2013.01); *H04L 67/1044* (2013.01); *H04L 67/55* (2022.05)

(58) Field of Classification Search
CPC ..... H04L 9/3213; H04L 67/55; H04L 9/0825; H04L 9/3228; H04L 12/1822; H04L 67/1044
USPC .......................................................... 726/9
See application file for complete search history.

(56) References Cited

U.S. PATENT DOCUMENTS

| | | | |
|---|---|---|---|
| 7,661,131 B1* | 2/2010 | Shaw | H04L 63/029 709/227 |
| 2019/0007227 A1* | 1/2019 | Ferreira | H04W 4/02 |
| 2020/0372140 A1* | 11/2020 | Jaber | H04L 12/1822 |
| 2021/0256481 A1* | 8/2021 | Suzuki | G06Q 10/02 |
| 2021/0288829 A1* | 9/2021 | Zhang | H04L 9/3213 |
| 2021/0335502 A1* | 10/2021 | Cordell | G06F 40/58 |
| 2022/0385857 A1* | 12/2022 | Ittelson | H04N 7/155 |

* cited by examiner

*Primary Examiner* — Moeen Khan
(74) *Attorney, Agent, or Firm* — STANDLEY LAW GROUP LLP; Jeffrey Standley; Adam Smith

(57) ABSTRACT

A method of authenticating devices for secure data exchange. A system receives a scheduling request and generates a ledger of participants authorized to be admitted to a communication session during a time window. For each participant, the ledger includes a participant identifier, a participant key, and a meeting identifier corresponding to the communication session. The participant key and meeting identifier are encoded into a short-code which is redeemed, by the participants, for an access token authorizing a peer-to-peer connection between devices within a meeting room during the communication session. The participants include a host who has special privileges during the communication session, and one or more clients.

12 Claims, 5 Drawing Sheets

SYSTEM AND METHOD OF AUTHENTICATING DEVICES FOR SECURE DATA EXCHANGE

FIELD OF THE TECHNOLOGY

The subject disclosure relates to secure data exchange between devices, and more particularly, systems and methods for facilitating a secure connection between devices without the exchange of any personal information about the device or its user.

BACKGROUND OF THE TECHNOLOGY

Digital data exchange between devices is everywhere, with data constantly being exchanged between phones, laptops, servers, and other devices. As data is transferred between many devices, it becomes a challenge to ensure that the data is being exchanged securely, particularly when sensitive data is exchanged. Various methods for authenticating data exist. For example, many systems use account registration and login systems to ensure a given user or device is authorized to receive certain data. In other examples, a link and/or password can be provided to a device to give the device access to a meeting room where data is exchanged. These systems come with flaws, including that they rely on authentication information which can potentially be compromised and used by an unauthorized device.

In certain environments, additional challenges are presented to ensure data is exchanged securely, and in compliance with other requirements of the relevant environment. For example, the Health Insurance Portability and Accountability Act (HIPAA) includes a number of requirements that come into play when considering the exchange of data related to healthcare, including restrictions on how protected health information (PHI) can be stored. This makes it difficult to facilitate a telemedicine visit between a doctor and patient, since personal information about the patient cannot be stored and used to authenticate the patient as they join the meeting room.

SUMMARY OF THE TECHNOLOGY

In at least one aspect, the subject technology relates to a method of authenticating devices for secure data exchange. The method starts, at step a), with receiving, by a system, a scheduling request, and in response to the scheduling request, generating a ledger of participants authorized to be admitted to a particular communication session during a time window. The ledger includes, for each participant, a participant identifier, a participant key, and a meeting identifier corresponding to the particular communication session. The participant key and meeting identifier are encoded into a short-code for the corresponding participant. The participants include a host and at least one client. At step b) the host redeems, from the system, a short-code corresponding to an access token authorizing the host to connect to the particular communication session during the time window and defining privileges for the host. At step c), the short-code corresponding to each client is provided to that client. At step d), each client requests redemption of the short-code corresponding to said client for an access token corresponding to said short-code. At step e), in response to a client requesting redemption of a short-code, the system de-codes the short-code into separate parts including the participant key and the meeting identifier, and if a match is found with the ledger, the system provides an access token to said client. The access token provides information for, and authorizes entering, a meeting room based on the meeting identifier, the meeting room allowing for a peer-to-peer connection between devices within the meeting room during the particular communication session.

In some embodiments, during step e), the short-code is redeemable during the time window. In some cases, if the client redeems the short-code prior to the start of the time window, no access token will be granted. In some embodiments, if the short-code is redeemed after the time window, no access token will be granted and the short code will be rendered non-functional.

In some embodiments, the time window includes a first time period representing the time parameters for the particular communication session and a second time period outside of the first time period. The short-codes can then be redeemable during the first time period, with the access tokens authorizing a connection to the particular communication session during the first time period. At least one short-code can be redeemable during the second time period.

In some embodiments, the system wraps each short-code in a vendor specific payload based on a device type associated with the client corresponding to short-code. In some cases, each client includes an application associated with the method of authenticating devices. The system can then send a push notification to each client and launch the application on said client, the launch of the application causing each client to connect to the system and execute steps d)-e). In some embodiments, the access tokens do not include information related to the user of the corresponding device.

In some embodiments, the system is a telemedicine system and the peer-to-peer connection enables the transmission of video streams. The host can also be a device operated by a healthcare provider, with each client being a device operated by a patient. After step e), the method can include healthcare provider provides telemedicine care to at least one patient through the particular communication session. In some cases, during the particular communication session, the host can revoke access for any client within the meeting room.

In some embodiments, the ledger includes a numeric tuple generated for each participant based on the particular communication session and time window, each numeric tuple including the participant identifier and participant key for said participant. In some cases, the numeric tuples further include a signing secret kept by the system, wherein the signing secret is the same for all numeric tuples and changing the signing secret invalidates all access tokens.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

The subject technology overcomes many of the prior art problems associated with secure data exchange. In brief summary, the subject technology provides a system and method for secure, peer-to-peer data exchange between devices. While the subject technology can be implemented in various environments, the subject technology has been found to be particularly advantageous when used in a telemedicine environment, as the technology can be utilized for a HIPAA compliant video conference between a patient and provider. The advantages, and other features of the systems and methods disclosed herein, will become more readily apparent to those having ordinary skill in the art from the following detailed description of certain preferred embodiments taken in conjunction with the drawings which set forth representative embodiments of the subject technology.

Figure 1:
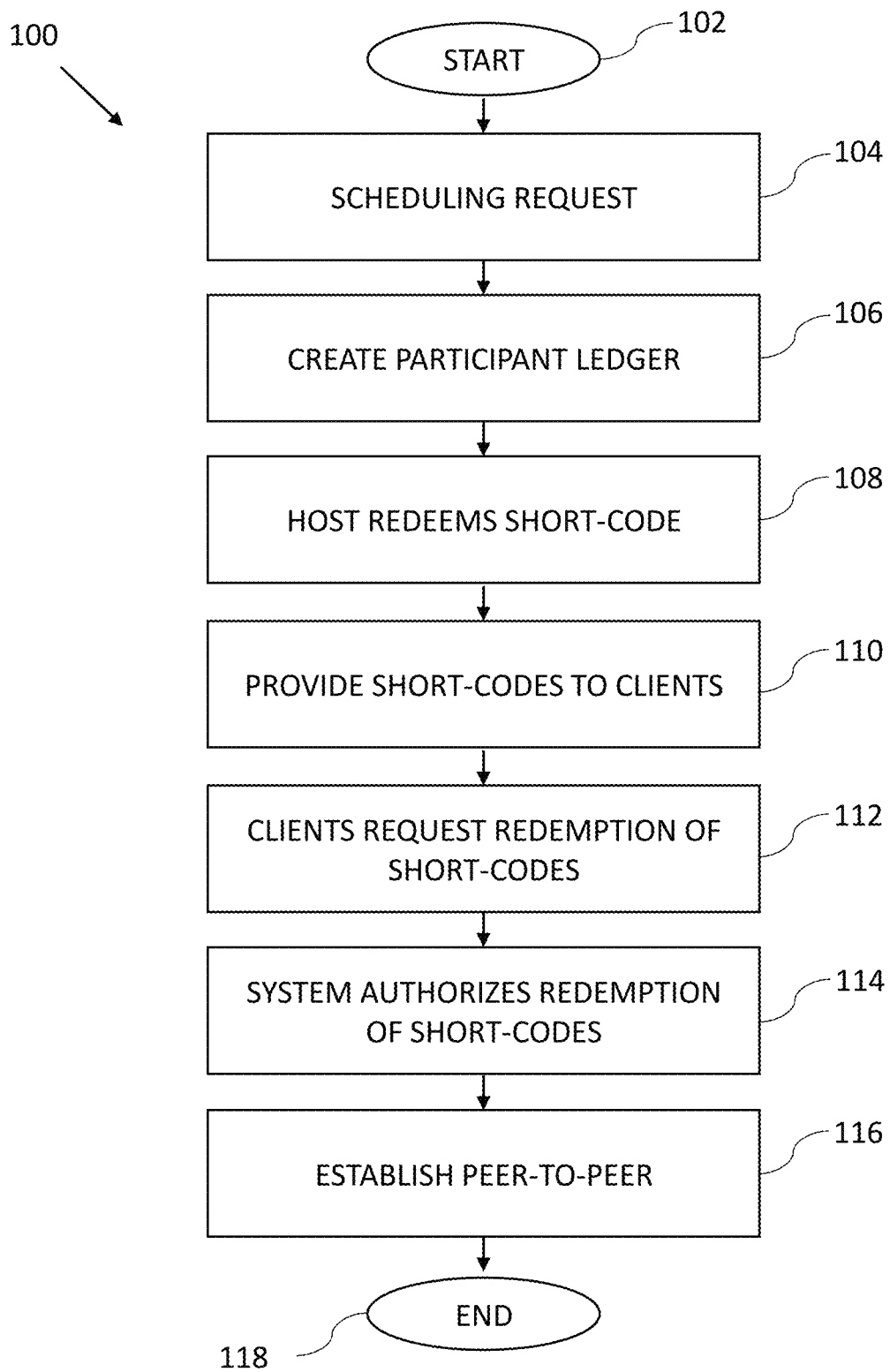
FIG. 1 is a flowchart of a method in accordance with the subject technology.

Referring now to FIG. 1, a flowchart of an exemplary method 100 in accordance with the subject technology is shown. The method 100 utilizes a system for secure authentication and peer-to-peer data exchange between devices. While the method shown in the flowchart 100 is applicable in many environments, the method is HIPAA-compliant which provides particular advantages in a healthcare environment. In particular, the method provides a secure and HIPAA-compliant access system for video telemedicine encounters using non-fungible access tokens that do not require users to have a permanent login account (e.g. a username and password) within the system. The system instead uses stateless authentication, independent of any third-party system, for authenticating specific devices, which is context bound and data isolated. Only a set of participants that are predefined on a participant ledger are able to access a video meeting room which facilitates the peer-to-peer connection between devices. Any given participant's access can be permanently revoked without affecting the access of other active participants. Further, new participants can be easily added by a host without any pre-registration, as the participant only needs to be added to the ledger and be given the unique access token to the meeting room and time. With the access token, any participant in the ledger can find the other participants in the peer-to-peer network where the video telemedicine room exists. In some cases, the system can be designed so that participants can only join the peer-to-peer meeting room after the host has joined, with the host having unique privileges to revoke access tokens of individual participants for further security. For ease of explanation, the method 100 is described as being carried out in an exemplary telemedicine environment. However, it should be understood that the method 100 could also be carried out in other environments where data is exchanged between devices.

The method 100 begins, at step 102, and a request for a meeting (e.g. a telemedicine visit) is sent to the system at step 104. It should be noted that while many actions are described as involving the system, the system may include a number of different individual system components, such as separate servers or the like, as will be discussed in more detail herein. Upon receiving the request for scheduling a telemedicine visit, the system allocates a meeting with a unique numeric identifier ("M"), in the telemedicine service for a predetermined future time window ("T"), and generates a list of numeric tuples (with a unique identifier "P" and a special participant key "K") for each participant that will attend the meeting. It should be understood that meetings, as used herein, represent a communication session between remote devices operated by users. The random identifiers M, P, and K can be numeric, which allows for simple encoding.

At step 106, the participants are added to a list ledger stored on the system which dictates who is able access the meeting M at the time-window T. For every participant allocated, the unique tuple ($M_n$, $K_n$) is cryptographically encoded into a short-code ($S_n$) that can be distributed to participants, where each participant has a unique K (wherein n is indicative of different individual participants). As the ledger and short-codes are created, one participant will be marked as a host. In a telemedicine environment, the host can be a device, such as a phone or laptop, controlled by a doctor or other healthcare provider providing healthcare services during the telemedicine visit. The short-code corresponding to the host is used for the host to connect to the meeting. This short-code entry in the list for the host is provided back to a scheduling service within the system (e.g. scheduling service 204, as discussed below).

Prior to the start of the meeting, at step 108, the host connects to the system to retrieve information about the upcoming meeting and redeems their short-code for an access token. The access token of the host authorizes the host to connect to the communication session during the time window, and defines privileges for the host. In some cases, access to the communication session can be granted by allowing the host to access a media room service (e.g. media room service 228, as discussed below), which provides peer-to-peer signaling information for the communication session.

At step 110, short-codes are prepared for the remaining participants of the meeting (referred to as clients), which can include devices operated by one or more users, receiving, or involved in, healthcare services being provided during the meeting. The clients may include one or more devices of a single patient, multiple patients, and/or other individuals involved in the healthcare decisions and needs of the patients. The system then notifies the client devices (e.g. via notification service 234, discussed below) of an incoming telemedicine call which includes the short-code for the client and a payload. It does this by packaging up the unique short-code into a vendor specific relay format depending on the client device type: this could be a VoIP push, remote push notification (APNS/FCM), SMS, or direct audio call through a phone number (IVR). It makes this determination based on whether the user of the device had previously registered a preferred client to receive a telemedicine call. For example, client devices are registered when a user launches an application on their iPhone, or other device, associated with the telemedicine system 200. This send a message to the system 200 to register the device, and information about the device type can be stored in the notification service 234. Given the registration information for the user, the notification service determines 234 the best way to send the short-code information to that specific device. The information that is sent in this communication is HIPAA compliant as it does not contain any protected health information (PHI), and instead includes only client device information. There is no need to use the patient's name or password for authentication.

During the time window, or prior to the start of the time window, each client attempts to redeem their short-code with the system, at step 112. The system then performs a check to authorize the redemption of the short-code, at step 114.

The system decodes the short-code into its tuple parts and performs a lookup for the meeting information. If the information from the short-code validates, the system authorizes the client and returns a non-fungible access token for the client device to use when requesting additional features.

At step 116, a peer-to-peer connection is established between participants. The client can use their access token to fetch the peer-to-peer connection room information from the system (e.g. media room service 228). With this, the client can locate and make a WebRTC peer-to-peer connection to all other participants of the meeting, including the host. The host can have particular privileges during the meeting, such as the ability to revoke access tokens of any other participant to remove them from the meeting. Using the peer-to-peer connection, video data can be exchanged between devices, with the healthcare provider (host) video conferencing with the clients (patients) to provide telemedicine services. After the meeting is complete, the method ends at step 118.

Figure 2:
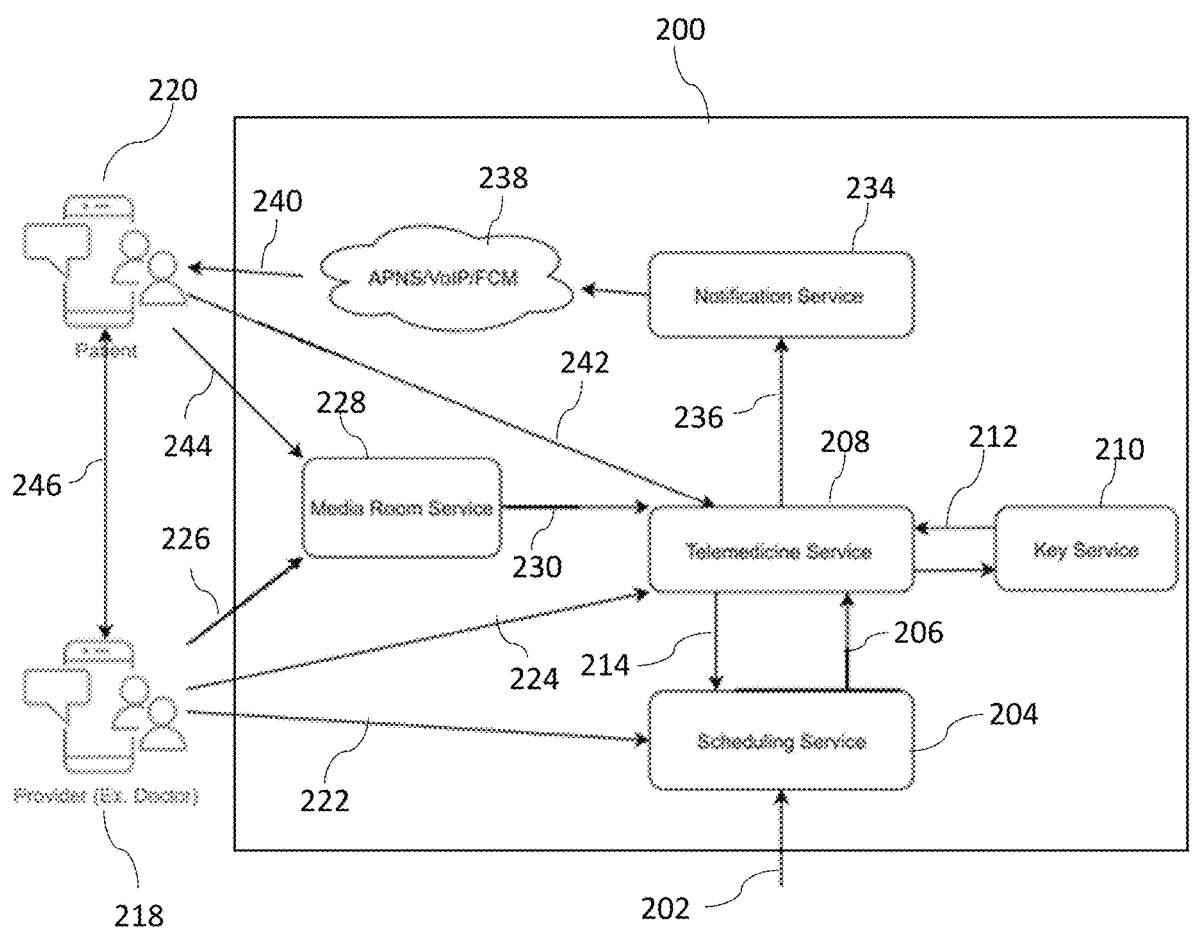
FIG. 2 is a block diagram of a system operating in accordance with the subject technology.

Referring now to FIG. 2, a block diagram of a system 200 operating in accordance with the subject technology is shown. The system 200 includes exemplary parts designed to carry out the secure data exchange process described herein (e.g. as described in method 100), to carry out a communication session, such as a telemedicine meeting. The various services described within the system 200 can be carried out by a single device (e.g. a computer system) or by multiple separate devices. The arrows represent steps taken as the system 200 is utilized as part of an exemplary process. As discussed above, the system 200 facilitates secure data exchange between a host (provider device 218) and one or more clients (patient device 220).

Initially, a telemedicine visit is booked (202) and sent to a scheduling service 204. The scheduling service 204 allocates a time-window and participant placeholders, marking one of the participants as the host. The method proceeds along path 206, and a telemedicine service 208 connects to key service 210 where random participant identifiers and keys are generated. The method proceeds along path 212, with the key service 210 returning participant identifiers, keys and short-codes for the meeting. The method proceeds along path 214, with the telemedicine service then returns host connection information back to the scheduling service 204. At the time of the meeting, the provider 218 connects (222) to the scheduling service 204 to fetch scheduled visit information, including the short-code corresponding to the host. The provider 218 uses this information, including the short-code, to authenticate with the telemedicine service 208 and fetch an access token (224).

The provider 218 can then connect (226) to a media room service 228. The media room service 228 provides peer-to-peer signaling information back to provider 218, allowing the provider 218 to connect to a video room for the meeting. Upon connection of the provider 218 to the room, the media room service 228 signals to the telemedicine service that the host joined (230). The telemedicine service 208 then sends short-codes (authentication) for the remaining participants to the notification service 234 to send to the remaining participants who have previously registered their devices (236). The notification service 234 then wraps the authentication short-code in vendor specific payload depending on the target client 220, at block 238 and sends it to be delivered (240).

The patient's client device 220 receives a notification, such as a push notification, which triggers code to launch a telemedicine application and connect to the telemedicine service 208 to redeem the short-code for a stateless access token (242). The patient's client device 220 then uses the access token to connect to the media room service 228 to get signaling information and the list of other client devices 220 connected to the room (244). The patient's client device 220 can then connect to the private and secure peer-to-peer network, using the access token, where the host 218 and other participants (e.g. clients 220) are connected (246).

Figure 3:
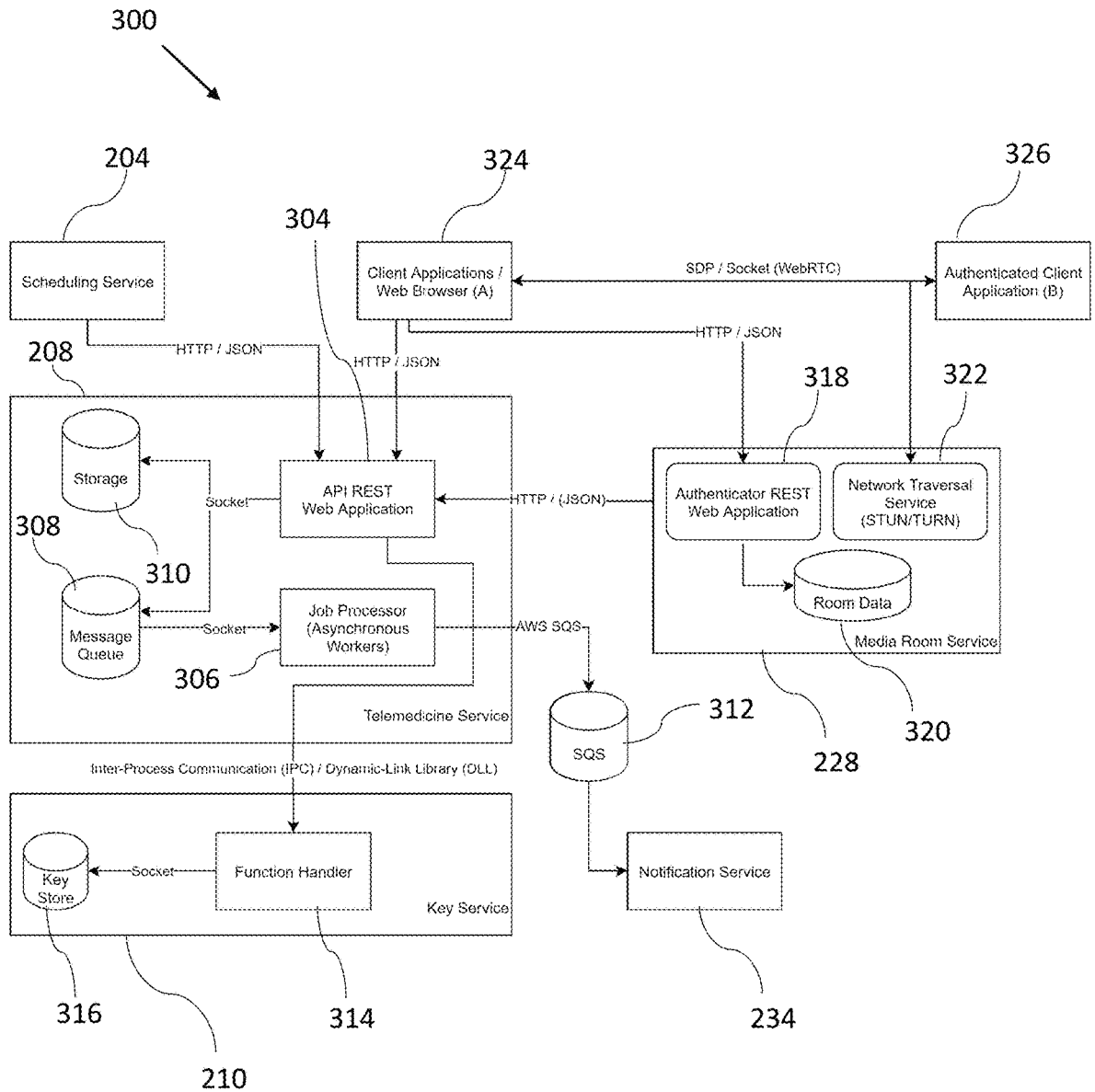
FIG. 3 is a block diagram system architecture for a system in accordance with the subject technology.

Referring now to FIG. 3, a block diagram of exemplary system architecture for the system 200 is shown generally at 300. While other systems and/or components may also be included, FIG. 3 is representative of one exemplary configuration of the system 200. The telemedicine service includes 208 an API REST web application 304, an asynchronous job processor 306, a message queue 308 and a database storage engine 310. The responsibility of the telemedicine service 208 is to interact with API requests (clients and other servers), process the payload and perform business logic. To that end, the telemedicine service 208 can do the following: create telemedicine meetings within the specified time window; interact with the key service 210 to generate and decode secure-random information; enqueue, at scale, tasks such as notifications for further processing; and listen for incoming event triggers from the media room service 228 (specifically the event when a participant connects/disconnects to a room).

The API REST web application 304 (or web application 304) utilizes the standard HTTPS web protocol with a JSON payload to receive incoming API requests from clients through the internet (e.g. through cellular, WiFi, or the like). It exposes a standard REST API to clients. Internally the web application 304 communicates with the database storage 310 and message queue 308 through a socket connection. In some implementations, the application 304 can be a RACK-based web application (i.e. a standard web application on Ruby containing middleware software). The telemedicine system 208 also includes storage 310, which is a database used to store all meeting information, including the ledger of participants. In some implementations, the storage 310 can be a NoSQL database (non-structured, such as MongoDB) in order to store all the details of a meeting object without requiring relations to any other data in the system 300 (one large structured document).

The meeting information can be stored in storage 310, including at least the following: An "id", representing a unique digit-only identifier field, (generated by the key service 210); a "title", representing the title of the meeting for display; a "start_time" representing the start time of the scheduled meeting; a "duration", representing the number of seconds the meeting is expected to take; a "time_zone", representing the effective time zone of the meeting (a default may also be set); a "status" representing the state of the meeting, such as pending, started, expired, canceled, or ended; a "room", which can optionally be included for unique slug identifier for ad hoc meetings; an "access_mode" representing the meeting type (ad hoc or scheduled); "participants", representing a list of embedded participant objects representing all the attendees of the meeting; an "account_id", representing the account record that originally created a given meeting; "wperm", representing a list of participant IDs that are allowed to modify the meeting information; "rperm", representing a list of participant IDs that are allowed to read the meeting information; "c_at", a timestamp of the meeting creation time; and "u_at", a timestamp of the last time the meeting was updated. Notably, this data is exemplary of data that can be stored within storage 310 to facilitate operation of the system 300, and one skilled in the art would understand that the exemplary data points described above are not all strictly necessary, nor is the list of data points meant to be all inclusive of possible data that could be stored.

Further, every participant is stored in the "participant" property of the meeting record, which means participant records are "embedded documents" inside the meeting record. The structure stored in this property can include the following: an "id", representing a unique case-sensitive identifier which is used to identify the participant and manage permission access to the meeting generated by key service 210; a "role" representing the role of a participant (e.g. host or client); a "pin" or "key", representing a digit-only participant-unique identifier used for authenticating a participant to a specific meeting (generated by key service 210). The key service 210 can utilize a database, such as MongoDB or the like.

The message queue 308 is used to communicate between the web application 304 and the job processor 306. The message queue 308 is a standard message queue system where messages that can be interpreted as "tasks or jobs" can be enqueued and later processed by the job processor 306. This allows the web application 304 to be highly performant and delay any tasks that can be done at a later time, and also to properly throttle a large volume of tasks. This can be implemented with a standard key-value store such as REDIS. One advantage of using the message queue 308, rather than a direct connection between the web application 304 and job processor 306, is to allow for persistent storage of these messages in the case the job processor 306 is down or unavailable. If the job processor 306 comes back online from a fault, the job processor 306 can then retrieve the pending messages from the message queue 308.

The job processor 306 is a long running application that is triggered when messages are added to the message queue 308. Every message in the message queue 308 is interpreted as a task that can be done by the job processor 306. The job processor 306 is in charge of notifying the notification service 234 depending on the actions and events that are triggered by the web application 304 component in the telemedicine service 208. This can include getting the meeting, participant, and key information that needs to be sent to target clients to allow them to join the meeting. Separating the job processor 306 from the web application 304 allows large volumes of tasks to be processed asynchronously given that any web application 304 would block if they had to perform the task themselves. This is due to web applications being limited to the number of active client connections at a given time and when a client connects to the web application 304, the connection is maintained until the entire work task is completed. If the web application 304 had to perform the entire task (e.g. including talking to several systems, dealing with timeouts, unable to retry work, interacting with notification service 234), it could become a bottleneck as future clients trying to connect to the web application 304 have to either hold or continue retrying until the web application 304 is able to service their request. This also makes the system fault-tolerant, because in the event that the job processor 306 goes down in the interim, the messages in the message queue 308 are persisted until the job processor 306 is back online, assuring notifications go out to clients as needed. The job processor 306 communicates with the notification service 234 through another global shared message queue, which can be a standard Amazon Web Services Simple Queuing Service (SQS) 312, which the notification service 234 listens to for events.

The key service 210 is a separate component that has a direct interface to the telemedicine service 208. This communication can either be Inter-Process Communication (IPC, the standard) or can be implemented as a binary, dynamically linked library into the main telemedicine service 208 application. The responsibility of the key service 210 is to interact with the telemedicine service 208 in a secure fashion and perform business logic. The key service 210 can generate secure-random UUIDs (Universally Unique Identifiers) for meeting ID, participant identifier and participant key. Using the set of identifiers listed, the key service 210 can also generate a specific short-code format for authentication, and can encode and decode short-code format links, as discussed herein. Further, the key service 210 can cryptographically sign, using a secret only known to the key service 210, and create access token payloads.

The key service 210 system is composed of a function handler 314 and a key store database 316. The function handler 314 can be an API software interface (a dynamic library) that can communicate with the key store database 316. The key store database 316 can be a secure storage key-value store database (e.g. REDIS) that stores secret data. The key store database 316 is only accessible by the key service 210 for security.

The media room service 228 is built with three important components, including an authenticator web application 318, a room database 320 and a network traversal service 322. The authenticator web application 318 is a service that receives an access token that has been signed by the telemedicine service 208. The access token is stateless and contains signed metadata, so there is no need to communicate with the telemedicine service 208 to verify its authenticity. Upon validation of the signed token, the authenticator web application 318 uses information in the token, which contains the unique and secure random meeting identifier, to create an entry in the room database 320 which stores "meeting room" data for the meeting.

The client application 324 then provides a publicly available IP (Internet Protocol) address and socket information that it will use to allow incoming connections for the peer-to-peer network. The authenticator web application 318 then stores client information and associates this information to the meeting in the room database 320.

The room database 320 is implemented as a key-value store (e.g. a standard REDIS database), where the key value is the meeting identifier, which doubles as the room identifier, and a list of participant identifiers and IP address pairs that are connected to the room. The IP addresses are provided by the client applications 324 when they authenticate to the authenticator service, and video conferences can then be held with peer-to-peer data exchange between authenticated client applications 326.

The network transversal service 322 can be a standard STUN/TURN protocol enabled service to support signaling and network traversal when creating peer-to-peer networks. This supports WebRTC (audio/video) over the internet when there are many firewalls and routers that may block clients from exposing public ports. All WebRTC clients, including the applications discussed herein, support using a STUN/TURN service.

The notification service 234 receives events from the SQS 312 queue and delivers over-the-air triggers to the remote clients. The triggers can be push notifications, VoIP, SMS, or similar, for example, and can depend on the type of client device.

Figure 4:
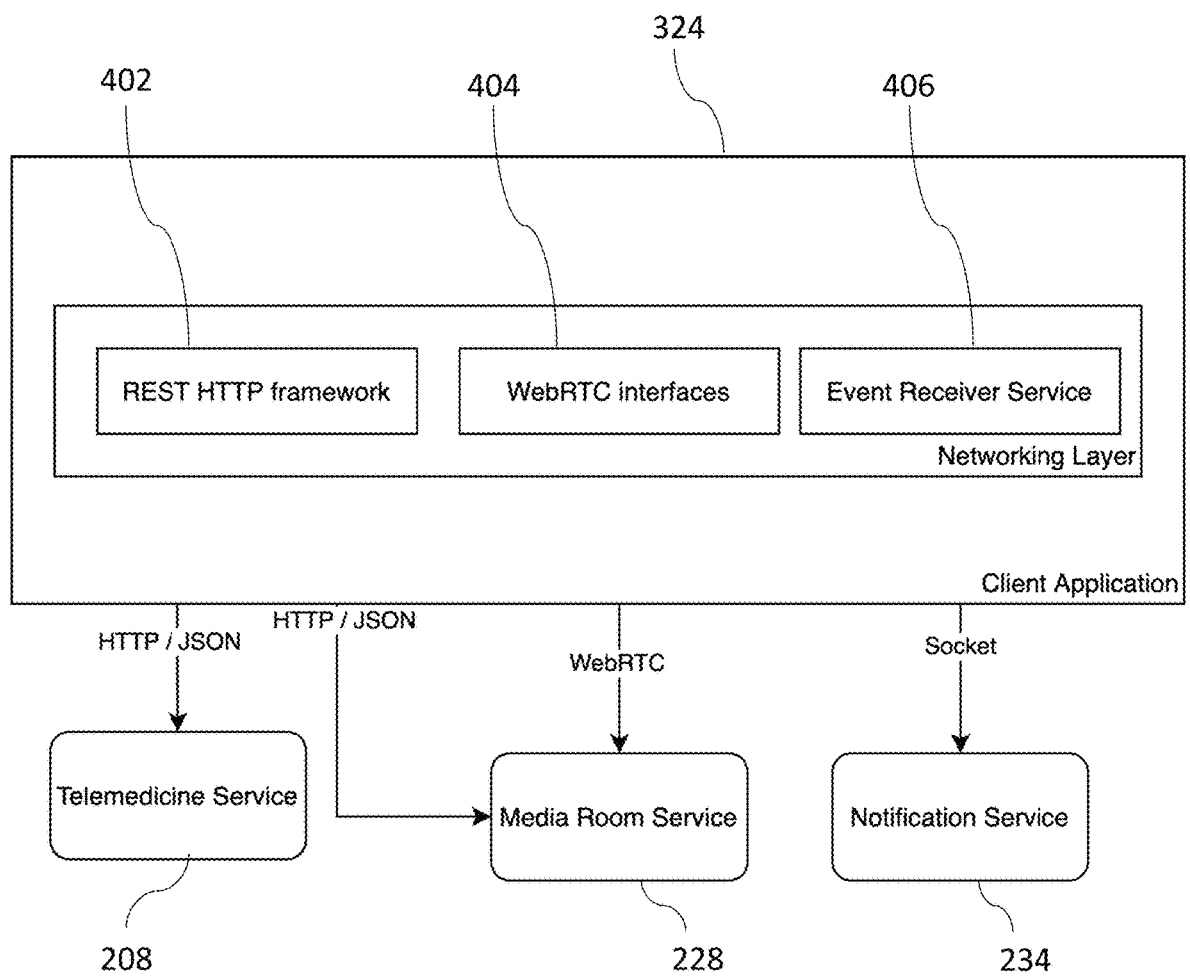
FIG. 4 is a block diagram of the components of a standard client application in accordance with the subject technology.

Referring now to FIG. 4, a block diagram of the components of a standard client application 324 are shown. The client application 324 requires three components to support the telemedicine system 300. In particular, the client application 324 needs a REST HTTP framework 402 to interact with the telemedicine service 208, WebRTC interfaces 404 (software component library) to interact with the media room service 228 and other peer-to-peer clients, and an event receiver service 406 to receive remote notifications. The client application 324 also includes a user interface 408 allowing input and output to be provided from and to the user through the application 324.

Figure 5:
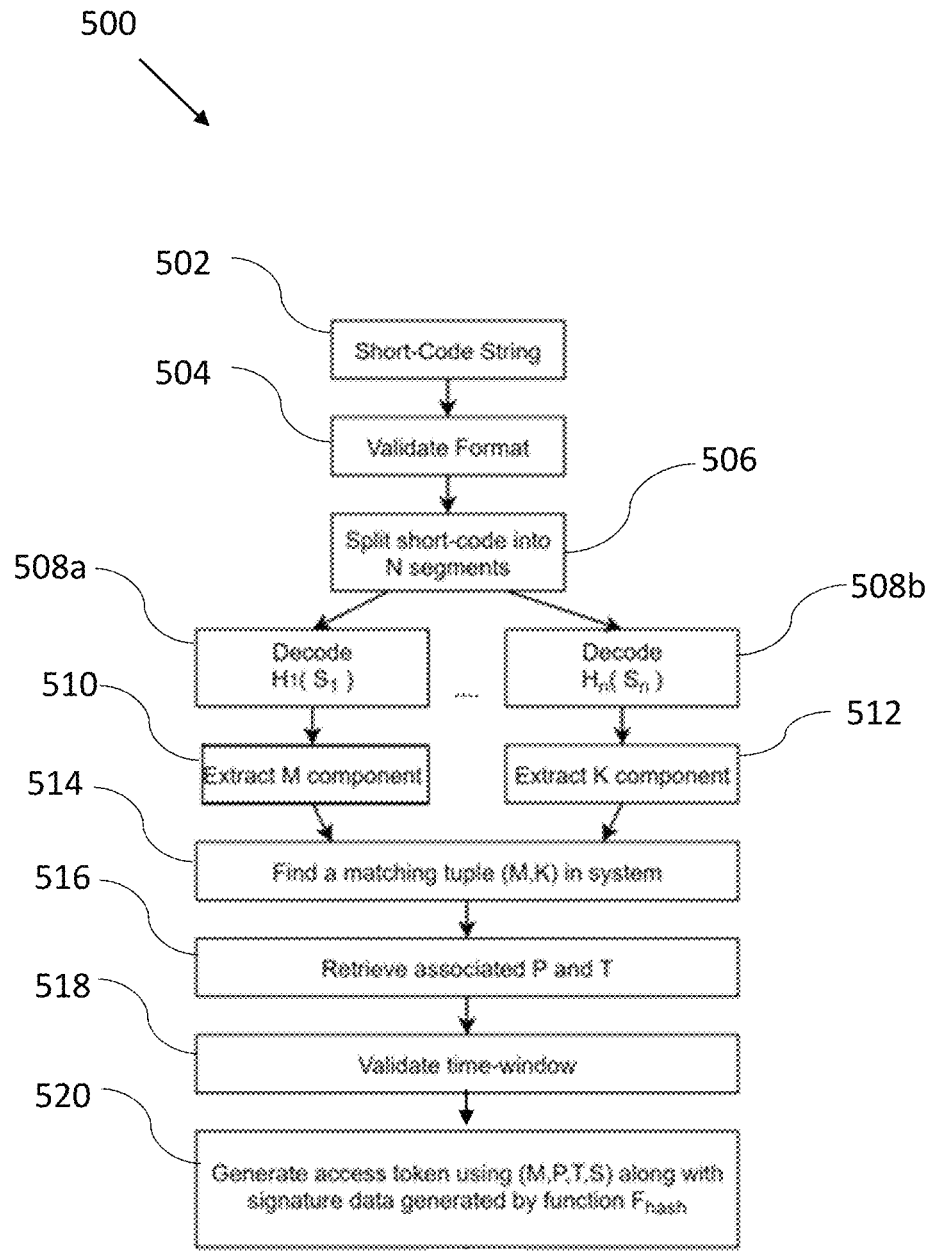
FIG. 5 is a flowchart of an exemplary process of generating an access token from a short-code in accordance with the subject technology.

Referring now to FIG. 5, a flowchart showing an exemplary process 500 of generating an access token from a short-code is shown. The short-code and access token can be used as part of the system 200, as described above.

At step 502, a short-code is received from the system and converted to UTF-8 string (e.g. "qqlj-bz70"). At step 504, the string is validated for its format. If the format is invalid then an error is returned. The string is then split into a number (N) of segments (S) at step 506 (e.g. "[qqlj, bz70]").

At steps 508a, 508b, each segment is passed to its corresponding cryptographic decoding function for segments 1 through N. A first segment (S1) is passed to a unique function corresponding to that segment (H1), for example "H(qqlj)". Similarly, the second segment (S2) is passed to a function (H2), for example "H(bz70)." This can be carried out until all segments are cryptographically decoded. Note that while only two segments are shown herein by way of example, it should be understood that this process can be carried out for the entire number N of separate segments.

At step 510, from the output of the segments, the globally unique meeting identifier (M) is extracted, for example "M=1234567". At step 512, the locally unique participant key (K) in relation to M is extracted using the output from the segments, for example "K=558852". At step 514, using M and K, a matching tuple (e.g. "[1234567, 558852]") is found where a unique valid meeting related to M contains a valid participant whose key matches K. If a matching record is found, the participant identifier (P) and the meeting time-window T are retrieved at step 516. At step 518, the time-window T is validated based on the current time in a default time zone (e.g. UTC time). Finally, at step 520, the system utilizes a signing secret (S) along with M, P, and T to generate an access token that contains a signature using hashing function F (e.g. an access token using M, P, T, S). The signing secret S is a sequence of random alphanumeric characters, kept by the server (not distributed or exposed to anyone) and previously created. The signing secret S is used to validate the information as only the server knows this unique value and can validate against it. If there was a need to revoke all access tokens at once, this can be used as a kill-switch, as changing the signing secret S would invalidate all tokens that had been previously granted.

The created access token can be a string of characters which can be decoded. The process of decoding an access token is to split it up into three parts. The first two segments are base64 encoded of JSON payload and contain structure data. The last segment is a signature that is validated by the system 200. Decoding the access token follows the same standard process as is used to decode JSON Web Token format, as is known in the art.

In summary, the system described herein provides a HIPAA-compliant access system for video telemedicine encounters with members (patients) using non-fungible access tokens. These access tokens do not contain any user identifiable information, or personal health information (PHI), making the system fully HIPAA-compliant. There is no association between participants across telemedicine meetings, as each participant is only locally unique and constrained to a specific meeting. One access token cannot grant access to different telemedicine meetings even if the same member exists on the participant ledger of both meetings.

An access token for a participant contains the metadata that describes the participant, their privileges, and scope. The access token is cryptographically encoded and signed providing stateless, time-bounded, and data-constrained access to the system for a device. This relieves the system from maintaining a list of session or user information regarding user access. If an access token is presented to the system and passes all validations, then any privileges and scopes (metadata) stated in the access token is granted to the corresponding member or provider, by the system, without any required lookup. The signed access tokens contain the pre-validated information that can be trusted when presented to the telemedicine service. This is a major performance improvement as it reduces the number of I/O (database) operations upon initial access. Access tokens are delivered ahead of time to members or providers, but are only activated/valid during the specific time-window, providing time-window security.

In addition, the encoded short-code format (more human readable) can be created by the system based on each allocated participant in order for participants to redeem them for access tokens at the appropriate time. The short-code strings are convenient to distribute, easy for participants to manage, and simple to redeem for an access token. The access tokens are only redeemable for a specific and unique access token. Revocation of an access token will also invalidate the corresponding short-code. Thus, in the case of a private short-code being compromised, that individual short-code can be revoked by the system while keeping any other participants in the meeting active and still allowing other participants with valid short-codes to connect. Short-codes thus inherit the same access control properties as the full access tokens.

With the access token, a participant gets the room connection details which provides information on how to connect to the other participants which share the same unique room and encryption information for this meeting through a secure peer-to-peer connection (WebRTC). The video connection between all the participants is fully peer-to-peer with no intermediaries or point of interception by the system. As long as the access token has not expired, participants can use it to leave/join the peer-to-peer video stream. Since the meeting room is pre-allocated to the number of authenticated participants, unauthorized people cannot join the meeting after the authenticated participants have joined (preventing meetings from potentially being flooded with unwanted users, resulting in a Denial of Service).

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology.

For example, each claim may depend on any or all claims in a multiple dependent manner even though such has not been originally claimed.

What is claimed is:

1. A method of authenticating devices for secure data exchange comprising:
   a) receiving, by a system, a scheduling request, and in response to the scheduling request, generating a ledger of participants authorized to be admitted to a particular communication session during a time window, wherein the ledger includes, for each participant of the ledger of participants, a respective participant identifier, a respective participant key, and a common meeting identifier corresponding to the particular communication session, wherein the respective participant key of a participant and the common meeting identifier is encoded into a respective short-code for the participant, wherein the participants include a host and at least one client;
   b) receiving from the host a short-code of the host and redeeming, by the system, the short-code of the host for an access token of the host, authorizing the host to connect to the particular communication session during the time window and defining privileges for the host;
   c) providing, to each client of the at least one client, the respective short-code;
   d) requesting, by each client of the at least one client, redemption of the respective short-code for an access token corresponding to the respective short-code;
   and e) in response to a client requesting redemption of the respective short-code, de-coding, by the system, the respective short-code received from the client, wherein the decoding includes:
   converting the respective short code into a string of valid format;
   splitting the string of valid format into plurality of segments;
   passing each segment of the plurality of segments into cryptographic decoding function unique to each segment to generate an output;
   extracting the respective participant key and the common meeting identifier from the output;
   retrieving the respective participant identifier and the time window responsive to match of the respective participant key and the common meeting identifier within the ledger;
   utilizing a signing secret along with the common meeting identifier, the respective participant identifier and the time window to generate the access token corresponding to the respective short code;
   and providing the access token corresponding to the respective short code to said client, wherein the access token corresponding to the respective short code provides information for, and authorizes entering, a meeting room based on the common meeting identifier, wherein the meeting room allowing for a peer-to-peer connection between devices within the meeting room during the particular communication session.

2. The method of claim 1, wherein, during step e), the respective short-code is redeemable only during the time window.

3. The method of claim 2, further comprising: during step e) denying grant of the access token corresponding to the respective short code to one of the at least one client attempting to redeem one of the respective short-code prior to start of the time window.

4. The method of claim 2, further comprising: during step e), denying grant of the access token corresponding to the respective short code to one of the at least one client attempting to redeem one of the respective short-code after the time window, and rendering the respective short-code non-functional.

5. The method of claim 1, wherein:
   the time window includes a first time period representing time parameters for the particular communication session and a second time period outside of the first time period;
   short-codes are redeemable only during the first time period;
   the access token corresponding to the respective short code authorizes a connection to the particular communication session only during the first time period; and
   at least one short-code is redeemable only during the second time period.

6. The method of claim 1, further comprising: wrapping, by the system, the respective short-code in a vendor specific payload based on a device type associated with the client of the at least one client providing the respective short-code.

7. The method of claim 1:
   wherein each of the at least one client includes an application associated with the method of authenticating devices; and
   further comprising sending, by way of the system, a push notification to each of the at least one client and launching the application on each of said at least one client following interaction with said push notification, wherein launch of the application causes each of the at least one client to connect to the system and execute steps d)-e).

8. The method of claim 1, wherein the access token corresponding to the respective short code does not include information related to a user of a corresponding device.

9. The method of claim 1, wherein:
   the system is a telemedicine system;
   the peer-to-peer connection enables transmission of video streams;
   the host is a device operated by a healthcare provider; and
   each of the at least one client is a device operated by a patient, wherein, after step e), the healthcare provider provides telemedicine care to at least one patient through the particular communication session.

10. The method of claim 1, wherein, during the particular communication session, the system provides the host with an option to revoke access for any of the at least one client within the meeting room.

11. The method of claim 1, wherein the ledger includes a numeric tuple generated for each participant of the ledger of participants based on the particular communication session and the time window, each numeric tuple including the respective participant identifier and the respective participant key for said participant.

12. The method of claim 11, wherein the numeric tuples further include the signing secret kept by the system, wherein the signing secret is common to all numeric tuples and changing the signing secret invalidates all access tokens.

* * * * *